United States Patent [19]

Curlee et al.

[11] Patent Number: 5,009,690

[45] Date of Patent: Apr. 23, 1991

[54] METHOD OF BONDING SINGLE CRYSTAL QUARTZ BY FIELD-ASSISTED BONDING

[75] Inventors: Richard M. Curlee, Tijeras; Clinton D. Tuthill, Edgewood; Randall D. Watkins, Albuquerque, all of N. Mex.

[73] Assignee: The United States of America as represented by the United States Department of Energy, Washington, D.C.

[21] Appl. No.: 490,895

[22] Filed: Mar. 9, 1990

[51] Int. Cl.$^5$ .............................................. C03C 27/00
[52] U.S. Cl. ...................................... 65/40; 65/43
[58] Field of Search ............ 65/40, 43, 58, 32.2, 65/30.1, 30.13; 156/89

[56] References Cited

U.S. PATENT DOCUMENTS

| | | | |
|---|---|---|---|
| 3,397,278 | 8/1968 | Pomerantz | 65/40 |
| 3,506,424 | 4/1970 | Pomerantz | 65/40 |
| 3,634,727 | 1/1972 | Polye | 317/231 |
| 4,405,970 | 9/1983 | Swindal et al. | 361/283 |
| 4,467,394 | 8/1984 | Grantham et al. | 361/283 |
| 4,513,348 | 4/1985 | Grantham | 361/283 |
| 4,530,029 | 7/1985 | Beristain | 361/283 |
| 4,643,532 | 2/1987 | Kleiman | 65/43 |

FOREIGN PATENT DOCUMENTS 2146566 4/1985 United Kingdom .................... 65/40

OTHER PUBLICATIONS

G. Wallis et al., "Field Assisted Glass-Metal Sealing", *Journal Applied Physics*, vol. 40, No. 10, 1970, pp. 3946–3949.
G. Wallis et al., "Field Assisted Seals of Glass to Fe-Ni-Co Alloy", *Ceramic Bulletin*, vol. 50, No. 12, 1971, pp. 958–961.
G. Wallis, "Direct-Current Polarization During Field-Assisted Glass-Metal Sealing", *Journal American Ceramic Society*, vol. 53, No. 10, 1970, pp. 563–567.

*Primary Examiner*—Kenneth M. Schor
*Attorney, Agent, or Firm*—Armand McMillan; James H. Chafin; William R. Moser

[57] ABSTRACT

The method of producing a hermetic stable structural bond between quartz crystals includes providing first and second quartz crystals and depositing thin films of borosilicate glass and silicon on portions of the first and second crystals, respectively. The portions of the first and second crystals are then juxtaposed in a surface contact relationship and heated to a temperature for a period sufficient to cause the glass and silicon films to become electrically conductive. An electrical potential is then applied across the first and second crystals for creating an electrostatic field between the adjoining surfaces and causing the juxtaposed portions to be attracted into an intimate contact and form a bond for joining the adjoining surfaces of the crystals.

16 Claims, 1 Drawing Sheet

METHOD OF BONDING SINGLE CRYSTAL QUARTZ BY FIELD-ASSISTED BONDING

FIELD AND HISTORICAL BACKGROUND OF THE INVENTION

The present invention is directed to a method of hermetically bonding single crystal quartz by field-assisted bonding. The Government has rights in this invention pursuant to Contract No. DE-AC04-76DP00789 awarded by the U.S. Department of Energy to AT&T Technologies, Inc.

Conventional technologies for joining quartz include application of organic adhesives, such as polyimide. However, two primary problems exist with this type of process. First, the long term stability of organics is suspect at best. The outgassing characteristics are well established and can affect hermeticity of the seal and the atmosphere within the resonator package. Second, these adhesives are applied in relatively thick films. Due to the large thermal expansion mismatch with quartz, large stresses can develop in the quartz that would alter its piezoelectric properties.

In addition, other sealing technologies, such as brazing or glass sealing, are unattractive for a number of reasons. First, the high temperatures, i.e., above 700° C., typically are required for sealing. Crystalline quartz exhibits an alpha-beta phase transition at 573° C. This transition is not fully reversible on cooling from above this temperature, and the structure and the original mechanical and thermal properties of the quartz are therefore adversely affected. Accordingly, upper exposure/use temperatures of about between 500°-550° C. have been recommended. Second, the thermal expansion characteristics of quartz prevent successful sealing by using previously established technology. For instance, Z-cut quartz is isotropic with a linear coefficient of thermal expansion (CTE) of about $180 \times 10^{-7}$/°C. from room temperature to 400° C. However, the CTE is much higher than commercially available sealing glasses. On the other hand, AT-cut quartz is anisotropic with a CTE in one direction of $136 \times 10^{-7}$/°C., and about $180 \times 10^{-7}$/°C. in the other. No sealing technology was previously available to join anisotropic, high expansion materials.

Accordingly, there exists a need in the art for a method of hermetically joining crystal quartz which does not suffer the disadvantages associated with conventional technologies.

OBJECTS AND SUMMARY OF THE INVENTION

The principal object of this invention is to provide a method of hermetically bonding quartz crystals.

An object of this invention is to provide a method of hermetically bonding single crystal quartz.

Another object of this invention is to provide a method of hermetically bonding quartz crystals which does not suffer the disadvantages associated with conventional technologies for joining quartz crystals.

Yet another object of this invention is to provide a method of hermetically bonding quartz crystals which would allow packaging of all quartz devices used in mechanical/piezoelectric sensor applications, such as timers, resonators, accelerometers, and the like.

An additional object of this invention is to provide a method of hermetically bonding quartz crystals which would permit the fabrication of quartz structures having complex geometries where machining is too costly.

Yet an additional object of this invention is to provide a method of hermetically bonding quartz crystals which includes an inorganic bonding medium to ensure long term stability.

A further object of this invention is to provide a method of hermetically bonding quartz crystals which preserves structural stability of the quartz crystals during fabrication of micromechanical devices.

Yet a further object of this invention is to provide a method of hermetically bonding quartz crystals which minimizes thermally induced stresses in the bond layers.

Still a further object of this invention is to provide a method of hermetically bonding quartz crystals which results in a bond that can withstand substantial thermal and mechanical shocks.

In summary, the object of this invention is to provide a method of hermetically bonding quartz crystals by field-assisted bonding. The method generally includes bonding of quartz crystals by a modified version of previously known field-assisted bonding technique, also known as electrostatic bonding, or anodic bonding.

BRIEF DESCRIPTION OF THE DRAWINGS

The above and other objects and advantages and noVel features of the present invention will become apparent from the following detailed description of the preferred embodiment of the invention illustrated in the accompanying drawings, in which.

DETAILED DESCRIPTION OF THE INVENTION

The method of the present invention includes a modified version of previously developed technology, known as field assisted bonding, also known as electrostatic bonding or anodic bonding. Field-assisted bonding (FAB) is a widely known procedure for joining certain glasses or ceramics to certain metals or semiconductors at low temperatures. Within an electric field at temperatures close to the glass transition temperature, large electrostatic forces are generated between the glass and metal. Due to the ionic migration of mobile alkali ions in the glass, a region at the interface of glass and metal is formed that is favorable to chemical bonding. The primary advantage of field-assisted bonding is the low temperatures, i.e., 300°-400° C., typically required for sealing compared to conventional fusion bonding.

Figure 1:
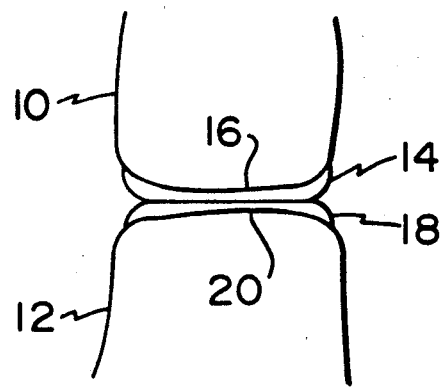
FIG. 1 is a simplified fragmentary elevational view of two single quartz crystals shown bonded in accordance with the method of this invention.

The method of hermetically bonding quartz crystals of the present invention includes modifying the surfaces of adjacent quartz samples 10 and 12, shown in FIG. 1, to provide an interface with sufficient reactivity to promote bonding therebetween. A thin film 14 of borosilicate glass, e.g. Corning 7740 Glass, or Pyrex, is deposited by sputtering onto a surface portion 16 of quartz crystal 10, while a thin film 18 of silicon is deposited by evaporation or sputtering onto a surface portion 20 of crystal 12. Since the thermal expansion coefficients of silicon and Pyrex, both about $32 \times 10^{-7}$/°C., are much lower than quartz, the films 14 and 18 are kept very thin to minimize the stresses resulting from expansion mismatch. Preferably, each film 14 and 18 has a thickness of about 3,000–13,000 angstroms. The thickness of each of quartz crystals 10 and 12 is about 0.025 to about 0.035", and preferably about 0.030". The crystals 10 and 12 are then juxtaposed in a surface contact relationship and bonds are made by heating the assembly including crystals 10 and 12 on a hot plate to a temperature of about 300° to about 450° C., and preferably about 400°. A d.c. electric field of about 900 to about 1600, and preferably 1000 volts, is then applied for approximately 45 minutes to about 135 minutes, and preferably about 60 to about 120 minutes for samples 0.030" thick. It should be noted that these parameters will vary depending on the dimensions of larger or smaller samples.

Various tests were conducted utilizing the method of present invention to determine the optimum thickness of the Pyrex and silicon films 14 and 18 on quartz crystals 10 and 12. In addition, tests were also conducted on sample seals made under different conditions, including helium leak detection, thermal shock and mechanical shock.

Table I lists the different thicknesses of silicon and glass that were deposited on AT-cut quartz samples. The silicon and glass layers were deposited by RF sputtering and thickness was measured by profilometry. All bonding experiments conducted with the quartz samples were heated to a temperature of about 400° C. and a voltage of about 1000 volts was applied for a period of about 60 minutes. Two samples were generated under each set of conditions.

TABLE I

| Thin Film Thicknesses (Angstroms) | | | |
|---|---|---|---|
| Silicon | | Pyrex Glass | |
| Specified | Actual | Specified | Actual |
| 500 | 500 | 500 | 480 |
| 1000 | 1144 | 1000 | 843 |
| 4000 | 4425 | 4000 | 4035 |

TABLE I-continued

| Thin Film Thicknesses (Angstroms) | | | |
|---|---|---|---|
| Silicon | | Pyrex Glass | |
| Specified | Actual | Specified | Actual |
| 8000 | N/A | 8000 | N/A |
| 12000 | 12409 | 12000 | 11620 |
| 16000 | 17190 | 16000 | 15885 |
| 20000 | 19179 | 20000 | 21958 |

In order to determine the effects of time on bond quality, experiments were performed for 15, 30, 60, 120 and 180 minutes on quartz samples with 4000 angstroms of both silicon and Pyrex films. As before, the samples were heated to a temperature of about 400° C. and the voltage applied was 1000 volts for each run. Following each run, the samples were examined visually and since the quartz plates are transparent, several things could be observed, such as (1) how completely the bond had progressed across the surface (the bonded area having a distinctly different tint than an unbonded area), and (2) film integrity, such as, crazing due to stress, discoloration to the reaction, etc.

Figure 2:
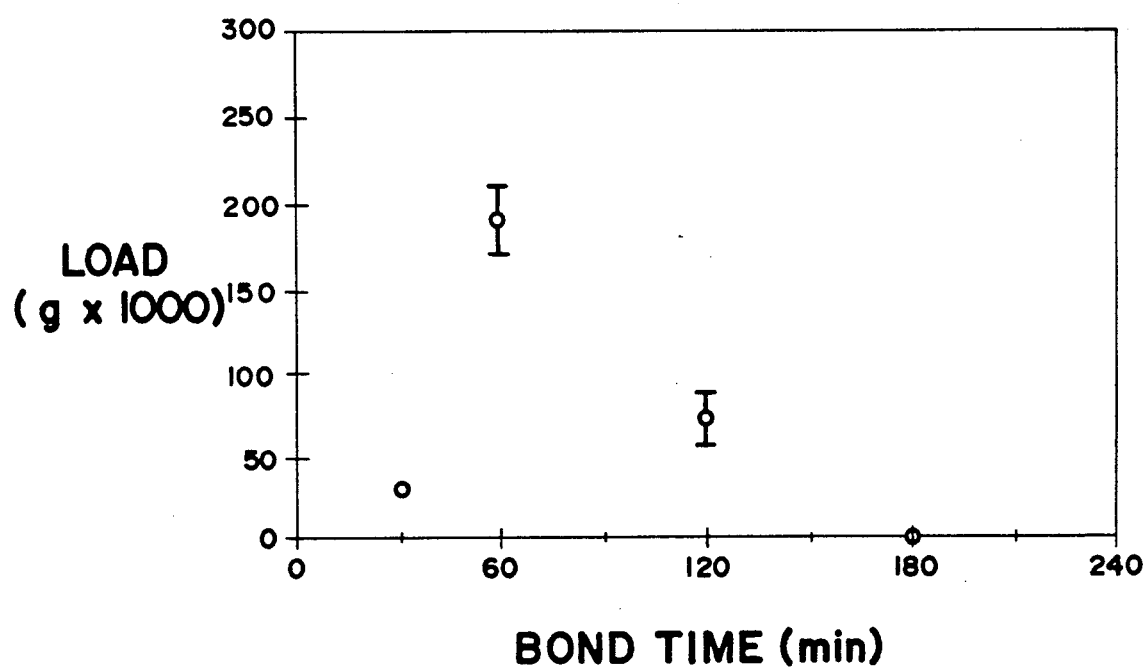
FIG. 2 is a graphical illustration of quartz bond load resistance plotted against bonding time.

Finally, each sample that appeared to be in good morphological condition, was subjected to further evaluation. FIG. 2 graphically illustrates a plot of load resistance versus bonding time and Table II is a summary of these results.

TABLE II

Results of Quartz Bond Evaluation

I. Thickness Study

| Si/Pyrex Thickness (Angstroms) | Visual | Hermeticity (cc He/cm$^2$ — sec) | Thermal Shock* | Mechanical Shock** |
|---|---|---|---|---|
| 500 | good film quality no bond | — | — | — |
| 1000 | good film quality no bond | — | — | — |
| 4000 | good film quality complete bond | $<10^{-9}$ | pass | NA |
| 12000 | good film quality complete bond | $<10^{-9}$ | pass | NA |
| 16000 | least good film quality least film crazing, each seal delaminated on cooling | — | — | — |
| 20000 | good film quality seals delaminated on cooling | — | — | — |

II. Time Study

| Bond Time (minutes) | Visual | Hermeticity (cc He/cm$^2$ — sec) | Thermal Shock* | Mechanical Shock** |
|---|---|---|---|---|
| 15 | ~33% bond complete | — | — | — |
| 30 | ~50% bond complete | — | — | 30 g |
| 60 | 100% bond complete | $<10^{-9}$ | pass | 200 g |
| 120 | 100% bond complete | $<10^{-9}$ | pass | 80 g |
| 180 | 100% bond complete bond delamination during handling | $<10^{-9}$ | — | 0 g |

*Thermal shock was performed from liquid $N_2$ to boiling water.
**Mechanical shock was performed under dynamic load in shear. Value reported is the highest load achieved prior to failure (cracking, loss of hermeticity).

As can be seen from Table II, the optimum film thickness for silicon and Pyrex glass on quartz crystals is between 4000 and 12000 angstroms. The poor bonding observed for the 500 and 1000 angstrom films, we believe, is due to the absence of a sufficient amount of material to permit the desirable chemical reactions without interference from the quartz substrates. Bonding was observed in relatively thick, i.e., 16000 and 20000 angstrom, films, but delamination was observed during cooling. In our opinion, this is due to high stresses caused by thermal expansion and mismatch. In one case, crazing of the film was actually observed.

Based on the above experiments, it is believed that at 400° C. and at an electrical potential of about 1000 volts, a period of one hour is the optimum bonding time for quartz samples with silicon and Pyrex glass films having a thickness of about 4000 angstroms.

As one of ordinary skill in the art would be aware that Pyrex glass has a softening point of about 800° C. and softens slightly under pressure at above 600° C., and silicon melts at about 1410° C. However, in the present invention both Pyrex glass and silicon bond at relatively lower temperatures, i.e. 300°–450° C.

While this invention has been described as having a preferred method, it is understood that it is capable of further modifications, uses and/or adaptations of the invention and following in general the principles of the invention and including such departures from the present disclosure as come within known or customary practice in the art to which the present invention pertains, and as may be applied to central features hereinbefore set forth, and fall within the scope of the invention or the limits of the claims appended hereto.

What is claimed is:

1. A method of producing a hermetically stable structural bond between quartz crystals, comprising the steps of:
   (a) providing first and second quartz crystals;
   (b) depositing a thin film of borosilicate glass on a portion of said first crystal, the borosilicate glass film having a thickness in the range of about 3,000 to about 13,000 angstroms;
   (c) depositing a thin film of silicon on a portion of said second crystal, the silicon film having a thickness in the range of about 3,000 to about 13,000 angstroms;
   (d) juxtaposing said portions of said first and second crystals in a surface contact relationship to thereby provide surface contact between said thin films;
   (e) heating said first and second crystals to a temperature for a period sufficient to cause said glass and silicon films on respective crystals to become electrically conductive; and
   (f) applying an electrical potential across said first and second crystals for creating an electrostatic field between the adjoining surfaces of the first and second crystals and causing the juxtaposed portions to be attracted into an intimate contact and form a bond for joining the adjoining surfaces.

2. The method of claim 1, including:
   (a) depositing said film of borosilicate glass on said portion of said first crystal by sputtering.

3. The method of claim 1, including:
   (a) depositing said film of borosilicate glass on said portion of said first crystal as a film having a thickness in the range of about 4,000 to about 12,000 angstroms.

4. The method of claim 1, including:
   (a) depositing said film of silicon on a portion of said second crystal as a film having a thickness in the range of about 4,000 to about 12,000 angstroms.

5. The method of claim 1, including:
   (a) said heating of said first and second crystals being to a temperature of about 300° to about 450° C.

6. The method of claim 1, including:
   (a) said heating of said first and second crystals being to a temperature of about 400° C.

7. The method of claim 1, including:
   (a) applying as said electrical potential about 900 to about 1600 volts across said juxtaposed first and second crystals.

8. The method of claim 1, including:
   (a) applying as said electrical potential about 1000 volts across said juxtaposed first and second crystals.

9. The method of claim 1, including:
   (a) applying said electrical potential across said juxtaposed first and second crystals for a period of about 45 to about 135 minutes.

10. The method of claim 1, including:
    (a) applying said electrical potential across said juxtaposed first and second crystals for a period of about 60 to 120 minutes.

11. The method of claim 1, including:
    (a) applying said electrical potential across said juxtaposed first and second crystals for a period of about 60 minutes.

12. The method of claim 1, including the step of:
    (a) providing said first and second crystals each with a thickness of about 0.030 inches.

13. The method of claim 1, including the step of:
    (a) providing said first and second quartz crystals as single crystal quartz.

14. A method of producing a hermetically stable structural bond between quartz crystals, comprising the steps of:
    (a) providing first and second quartz crystals;
    (b) depositing a thin film of a borosilicate glass on a portion of said first crystal, the borosilicate glass film having a thickness of in the range of about 3000 to about 13,000 angstroms.
    (c) depositing a thin film of silicon on a portion of said second crystal, the silicon film having a thickness in the range of about 3,000 to about 13,000 angstroms;
    (d) juxtaposing said portions of said first and second crystals in a surface contact relationship to thereby provide surface contact between said thin films;
    (e) heating said first and second crystals to a temperature of about 300° to about 450° C. for a period sufficient to cause said glass and silicon films on respective crystals to become electrically conductive; and
    (f) applying an electrical potential across said first and second crystals for a period of about 60 to 120 minutes for creating an electrostatic field between the adjoining surfaces of the first and second crystals and causing the juxtaposed portions to be attracted into an intimate contact and form a bond for joining the adjoining surfaces.

15. The method of claim 14, including:
    (a) applying said electrical potential across said juxtaposed first and second crystals for a period of about 60 minutes.

16. The method of claim 14 including:
    (a) applying as said electrical potential about 1000 volts across said juxtaposed first and second crystals;
    (b) depositing said film of a borosilicate glass on a portion of said first crystal as a film having a thickness in the range of about 4,000 to 12,000 angstroms; and
    (c) depositing said film of silicon on a portion of said second crystal as a film having a thickness in the range of about 4,000 to about 12,000 angstroms.

* * * * *